Dec. 29, 1942.  R. J. MILLER  2,306,639
BLADES FOR TURBOMACHINES
Filed Sept. 19, 1940
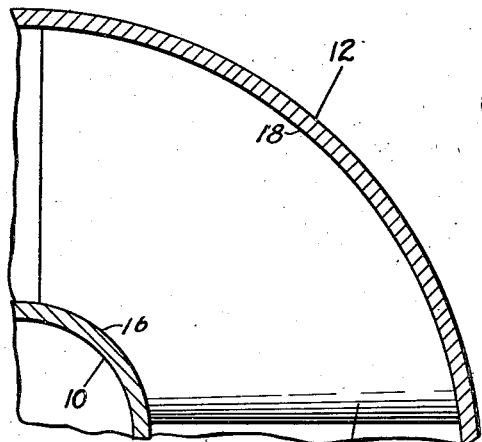
Fig. 1.
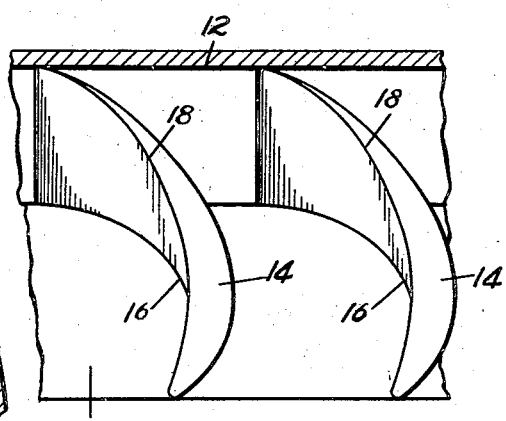
Fig. 2.
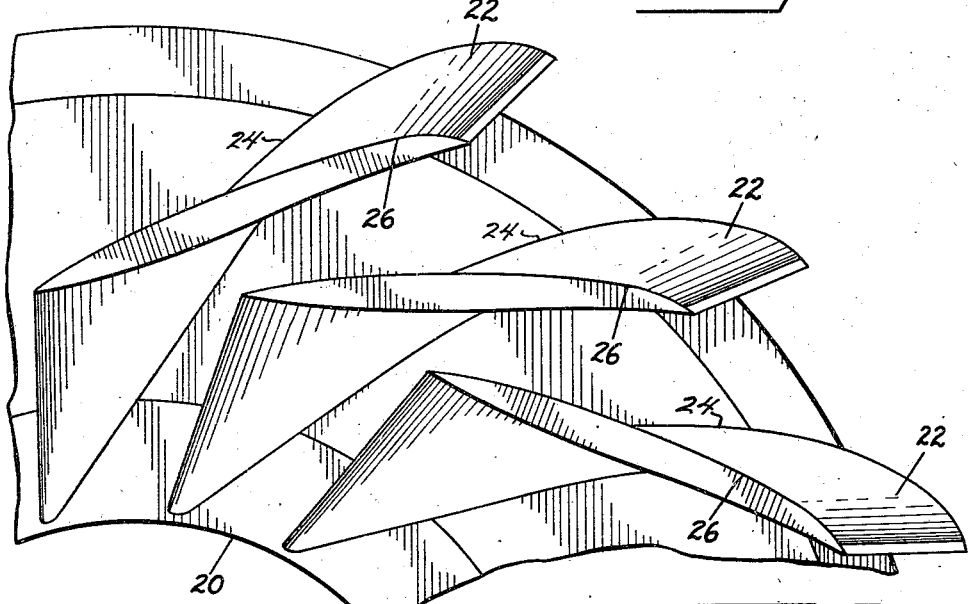
Fig. 3.
Fig. 4.
INVENTOR.
RAYMOND J. MILLER
BY
ATTORNEY.

Patented Dec. 29, 1942

2,306,639

UNITED STATES PATENT OFFICE 2,306,639

BLADES FOR TURBOMACHINES

Raymond J. Miller, Detroit, Mich., assignor to Hydraulic Brake Company, Detroit, Mich., a corporation of California Application September 19, 1940, Serial No. 357,488

10 Claims. (Cl. 103—115)

This invention relates to torque converters and more particularly to blades for fluid drives.

Generally in fluid drives, more particularly in torque converters, the blades have only one definite pitch angle. This has proved quite satisfactory in conventional structures of torque converters because it is possible to compute fairly accurately the required pitch angle of a blade to produce a given speed.

It has been found that a fluid channel of circular shape is more ideal since it does not cause an abrupt change of direction of the fluid flow in the circuit. This shape channel greatly reduces frictional and eddy losses inherent in a channel with straight portions. The eddy losses are caused by not restraining the formation of free vortex in the abruptly curved part of the channel after the termination of different sets of vanes or the lack of guidance of the fluid. If longer vanes are introduced in the circuit at these points to reduce the free vortex condition, another adverse condition is encountered, detracting from the efficiency of the unit. The fluid, because of the variation in its velocity, will not adhere to the entire surface of a single pitch angle vane. This means that only a portion of the vane is functioning for the fluid has a different pitch angle from that of the vane.

The difference in the pitch angles of the fluid in the circuit is caused by two important factors; first, the continual variation in length of radial travel of the fluid as it circulates around the torus-shaped circuit; and, secondly, the fluid circulating around the outside or periphery of the torus travels at a lesser speed than the fluid at the inner portion. This difference in velocity is attributed to several causes; first, because of the rotation of the fluid as a mass within the unit, centrifugal force is set up within the fluid, tending to retain it in contact with the outer housing under increased pressure so that the frictional drag on the fluid is greatly increased. Along with the forces created by this direction of rotation, still another centrifugal force is set up by the rotation of the fluid within the circuit itself. This centrifugal force is added to the fore-mentioned force, increasing the drag at the periphery. However, both these forces decrease the drag at the center because they tend to release the pressure of the fluid from the inner portions. The high drag at the external surface of the channel produces surface eddies or turbulences that further retard the flow of fluid.

From this it will be seen that the fluid travels around the circuit with a definite pitch angle at the center and another pitch angle at the periphery, and with numerous variations of pitch between these two at all points located between the two boundaries.

With these conditions before us, it is apparent that it would be advantageous to incorporate in the vane structure the merits of both the pitch angle at the periphery and the pitch angle at the center, with numerous variations of pitch between these two at all points located between the two boundaries.

With these conditions, it is apparent that it would be advantageous to incorporate the merits of both the circular fluid channel and the vane that lies in contact with the fluid flow over its entire surface. To meet these conditions, vanes each having a compound pitch angle are used. This allows the use of the circular shaped channel, eliminates the free vortex condition, and still has the high efficiency of the single pitch angle vane in a straight channel.

It is evident that the vane having a pitch angle that will conform with the fluid flow at the center, and having also a pitch angle at the outer edge that will conform with the flow of the fluid in this region, will give the desired results.

In fluid drive devices of the type to which the present invention relates it will be understood that the angle meant by the term "pitch angle" is that angle formed by a tangent to the vane surface at a given point with an axial plane passing through that point. In other words, it is the angle of the vane surface measured along the length of the vane in the direction of fluid flow therealong as distinguished from the pitch angle of a screw type blade which is the angle formed by the screw surface with the plane of rotation of the screw.

From the foregoing it should be clear that the invention aims to attain a blade of a variable contour for both impellers and turbines so that the velocity of the fluid seeks the pitch angle of the blade most suited at that particular instant.

An object of the invention is to provide a variable pitch blade for an impeller or a turbine.

Another object of the invention is to provide blades embodying compound angles of pitch for impellers and turbine to compensate for variations in speed of fluid flow.

Another object of the invention is to provide an impeller or a turbine including a plurality of equi-spaced blades each having a variable contour so that the velocity of the fluid may seek the angle of pitch of the blade most suited to the particular velocity of the fluid at the instant.

Other objects and advantages of the invention will appear from the following description taken in connection with the drawing forming a part of this specification and in which—

Fig. 1 is a fragmentary view of a torque converter illustrating the relation of the inner and outer shrouds to one another and the arrangement of blades embodying the invention secured between the shrouds;

Fig. 2 is an enlarged detail view illustrating a pair of vanes each having two angles of pitch;

Fig. 3 is an enlarged fragmentary plan view of an impeller with inner shroud removed and having blades embodying the invention; and Fig. 4 is a graph illustrating the action of the vane at different speeds.

Referring to the drawing for more specific details of the invention, 10 represents the inner shroud and 12 the outer shroud of a torque converter element. A plurality of equi-spaced blades 14 is suitably secured between the shrouds. Each of the blades has two pitch angles, a low pitch angle 16 and a relatively high pitch angle 18. The low pitch 16 is adjacent the inner shroud 10 where the fluid travels at the highest velocity, and the high pitch 18 is on the outside of the blade where velocity of the fluid flow is low due to the centrifugal force set up or produced by the velocity of the fluid and the rotation of the torque converter.

In one illustrated embodiment of the invention, the low pitch angle 16 is substantially thirty degrees (30°) and the high pitch angle is substantially forty-five degrees (45°). It has been found that this differential in the pitch angles of the blade produces a very efficient and satisfactory blade.

In another embodiment of the invention illustrated in Fig. 3, an impeller 20 has arranged thereon a plurality of equi-spaced blades 22 each having two angles of pitch; that is, a low pitch angle 26 and a relatively high pitch angle 24 as in the structure of the vanes of the turbine turbo hereinabove described.

It will be seen that because the fluid flow at the inner shroud 10 is at a greater lineal speed than the fluid flow at the outer shroud 12, it is necessary to have the pitch angle of the blade at the line where it connects with the inner shroud 10 at a low pitch angle so that it will conform with the fluid flow; and, likewise, it is necessary to have a high angle pitch at the outer shroud 12 where the fluid velocity is low so that it will also conform with the fluid flow.

Another feature in the use of a vane having two major pitch angles is that it will more readily meet the conditions that arise from the use of a torque converter on a motor vehicle. It is possible to compute accurately the most desirable angle for the vane to meet all the varying speeds to which the unit will be subjected.

By using compound pitch angles in the design of the blades, it is possible to compensate somewhat for these variations in speed; that is, as the speed of the oil flow in the torque converter increases, it is possible for it to assume a high degree of pitch; in other words, it can perform its work at high efficiency. Also, as the speed falls off, the pitch angle assumed decreases so that the most work possible with the kinetic energy of the fluid will be accomplished.

The aim is to attain a variable contour to the blade so the fluid with a given velocity may seek the angle of pitch most suited for its particular velocity at that instant. For this reason the steep or high pitch angle on the blade near the outside of the circuit where both centrifugal forces set up by the two directions of fluid flow tend to direct it at high speed, and the low pitch is placed on the inside or near the inner shroud where the fluid is more apt to travel when the centrifugal force and velocity is low.

It is, of course, clearly understood that the blades are entirely immersed in fluid at all times and that the density of the field of fluid varies or shifts to the center of mass away from the center of the blade and, accordingly, there is actually a high pressure condition at the periphery of the circuit.

While this invention has been described in connection with certain specific embodiments, the principal involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A blade wheel comprising a web, a plurality of equi-spaced vanes on the web each having an outer edge of greater arc than the arc of the inner edge, each vane having a high pitch angle at its outer edge and a low pitch angle at its inner edge.

2. A blade wheel comprising an annular web curved in the direction of flow through the blade wheel, a plurality of equi-spaced three-dimensional vanes on the web each curved in its own plane to follow the curvature of the web, each having a high pitch angle adjacent its outer edge and a low pitch angle adjacent its inner edge.

3. A blade wheel comprising an annular web curved in the direction of fluid flow through the wheel, and a plurality of equi-spaced three-dimensional vanes on the web each curved longitudinally of its length, each of said vanes having a high pitch angle adjacent its outer edge and a low pitch angle adjacent its inner edge, the low and high pitch angles converging substantially centrally of the vane.

4. A blade wheel comprising an inner and outer shroud each curved in the direction of flow through the blade wheel, and a plurality of equi-spaced vanes between the shrouds, each vane having a high pitch angle adjacent its outer edge and a low pitch angle adjacent its inner edge.

5. A blade wheel for a fluid transmission comprising spaced walls and a plurality of vanes between the walls providing a multiplicity of fluid channels each vane so contoured that the pitch of the vane at one wall so varies from the pitch of the vane at the opposite wall that the energy of the absolute flow of the fluid remains substantially constant across sections of the channels.

6. A blade wheel for a fluid transmission of the type having a toroidal liquid circuit, including an annular web and a series of three-dimensionally curved vanes on the web in annular array, each of said vanes having a flow angle at its inner edge different from the flow angle at its outer edge to provide varying pitch angles across the vane.

7. A blade wheel for a fluid transmission of the type having elements defining a toroidal fluid circuit, including a web and three-dimensional vanes arranged on the web in annular array, each of said vanes forming a different angle with a radius of the channel of the torus at its inner side edge than at its outer side edge to provide different pitch angles at various points along the length of the radius.

8. A blade wheel for a fluid transmission comprising means forming a fluid flow channel, vanes carried by said means spanning the channel each having a length extending along the channel in the direction of fluid flow therethrough to direct the flow of the fluid, each of the vanes being so contoured that its edges at the opposite sides of the channel lie at a different angle of pitch, so that the vanes have a different pitch at the opposite sides of the channel.

9. A blade wheel for a fluid transmission of the type having a toroidal fluid circuit comprising an annular web and a series of vanes thereon in annular array with the width of the vanes extending substantially radially of the torus from the web and with the length of the vanes extending along the web in the direction of fluid flow, the vanes being warped throughout their length so that the vane surface forms a different angle with a plane through the axis of the blade wheel at each point across the width of the vane to provide varying pitch angles across the vane width.

10. A blade wheel for a fluid transmission of the type having a toroidal fluid circuit comprising an annular web and a series of vanes thereon in annular array with the width of the vanes extending substantially radially of the torus from the web and with the length of the vanes extending along the web in the direction of fluid flow, the vanes being warped throughout their length so that each vane surface forms a smaller angle with a plane through the axis of the blade wheel at its inner than at its outer edge to provide a smaller pitch angle at the inner than at the outer edge of the vane.

RAYMOND J. MILLER.